United States Patent
Abe

(10) Patent No.: US 11,445,111 B2
(45) Date of Patent: Sep. 13, 2022

(54) IMAGE CAPTURE APPARATUS AND CONTROL METHOD

(71) Applicant: CANON KABUSHIKI KAISHA, Tokyo (JP)

(72) Inventor: Takamitsu Abe, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/399,794

(22) Filed: Aug. 11, 2021

(65) Prior Publication Data
US 2022/0053129 A1 Feb. 17, 2022

(30) Foreign Application Priority Data
Aug. 14, 2020 (JP) .............................. JP2020-136937

(51) Int. Cl.
*H04N 5/232* (2006.01)
*G03B 17/56* (2021.01)
*G03B 17/18* (2021.01)
*H02J 7/00* (2006.01)

(52) U.S. Cl.
CPC ......... *H04N 5/23241* (2013.01); *G03B 17/18* (2013.01); *G03B 17/566* (2013.01); *H04N 5/232939* (2018.08); *H02J 7/0063* (2013.01)

(58) Field of Classification Search
CPC ......... H04N 5/23241; H04N 5/232939; G03B 17/18; G03B 17/566; H02J 7/0063
See application file for complete search history.

(56) References Cited

U.S. PATENT DOCUMENTS

| | | | |
|---|---|---|---|
| 7,102,685 B2 * | 9/2006 | Nishimura | H04N 5/23241 348/371 |
| 9,948,094 B1 * | 4/2018 | Sheng | H02J 1/08 |
| 2010/0066898 A1 * | 3/2010 | Takaki | H04N 21/4184 348/372 |
| 2014/0009671 A1 * | 1/2014 | Ozone | H04N 5/23212 348/370 |
| 2017/0222459 A1 * | 8/2017 | Kang | H02J 7/007 |
| 2020/0007739 A1 * | 1/2020 | Sugiyama | H04N 5/23209 |
| 2020/0366136 A1 * | 11/2020 | Tachiwa | H02J 7/00045 |
| 2021/0336464 A1 * | 10/2021 | Fritz | H02J 7/0068 |

FOREIGN PATENT DOCUMENTS

JP 2002262168 A 9/2002

\* cited by examiner

*Primary Examiner* — Timothy J Henn
(74) *Attorney, Agent, or Firm* — Canon U.S.A., Inc. I.P. Division

(57) ABSTRACT

An image capture apparatus includes a connection unit to which an accessory apparatus is connected, a communication unit that communicates with a power source that supplies power to the image capture apparatus, and a control unit that determines power suppliable to the connection unit based on a predetermined value in a case where a predetermined communication with the power source is not to be performed. The connection unit is configured to supply power from the power source to the accessory apparatus.

8 Claims, 3 Drawing Sheets

FIG.3A

WITH THIS BATTERY OR POWER
SUPPLY APPARATUS, ACCESSORY
APPARATUS CONNECTED TO
ACCESSORY SHOE WILL NOT OPERATE

WITH THIS BATTERY OR POWER
SUPPLY APPARATUS, SUFFICIENT
POWER WILL NOT BE SUPPLIED
TO ACCESSORY APPARATUS
CONNECTED TO ACCESSORY SHOE

WITH THIS BATTERY OR POWER
SUPPLY APPARATUS, FUNCTIONS OF
ACCESSORY APPARATUS CONNECTED
TO ACCESSORY SHOE WILL BE
LIMITED ENTIRELY OR PARTIALLY

OK

IMAGE CAPTURE APPARATUS AND CONTROL METHOD

BACKGROUND

Field of the Disclosure

Aspects of the disclosure generally relate to an image capture apparatus and a method of controlling the image capture apparatus.

Description of the Related Art

Japanese Patent Application Laid-Open No. 2002-262168 discusses a video camera that operates the video camera and an accessory apparatus in a normal mode at high battery levels and operates the video camera or the accessory apparatus in a power saving mode at low battery levels.

If battery information is acquirable from a battery pack, an image capture apparatus such as a video camera can control operation of the image capture apparatus based on the battery information. However, in a case where the image capture apparatus cannot communicate with the battery pack for some reasons and thus cannot acquire battery information from the battery pack, it is expected that the image capture apparatus cannot control the operation of the image capture apparatus based on the battery information. For example, it is expected that supply of power from a power source to an accessory apparatus via a connection unit (e.g., accessory shoe) to which the accessory apparatus is connected may not be controlled as appropriate.

SUMMARY

According to various embodiments, an image capture apparatus capable of supplying power from a power source (e.g., battery) to an accessory apparatus via a connection unit (e.g., accessory shoe) and a method of controlling the image capture apparatus are provided.

According to various embodiments, there is provided an image capture apparatus that includes a connection unit to which an accessory apparatus is connected, a communication unit that communicates with a power source that supplies power to the image capture apparatus, and a control unit that determines power suppliable to the connection unit based on a predetermined value in a case where a predetermined communication with the power source is not to be performed, wherein the connection unit is configured to supply power from the power source to the accessory apparatus.

According to various embodiments, there is provided a method that includes communicating with a power source that supplies power to an image capture apparatus, and determining power suppliable to a connection unit to which an accessory apparatus is connected based on a predetermined value in a case where a predetermined communication with the power source is not to be performed, wherein the connection unit is configured to supply power from the power source to the accessory apparatus.

Further aspects of the disclosure will become apparent from the following description of exemplary embodiments.

BRIEF DESCRIPTION OF THE DRAWINGS

FIGS. 3A to 3C are diagrams each illustrating an example of a message displayed on a display unit of the image capture apparatus according to one embodiment.

DESCRIPTION OF THE EMBODIMENTS

Exemplary embodiments, features, and aspects of the disclosure will be described below with reference to the drawings. However, aspects of the disclosure are not limited to the following embodiments.

Figure 1:
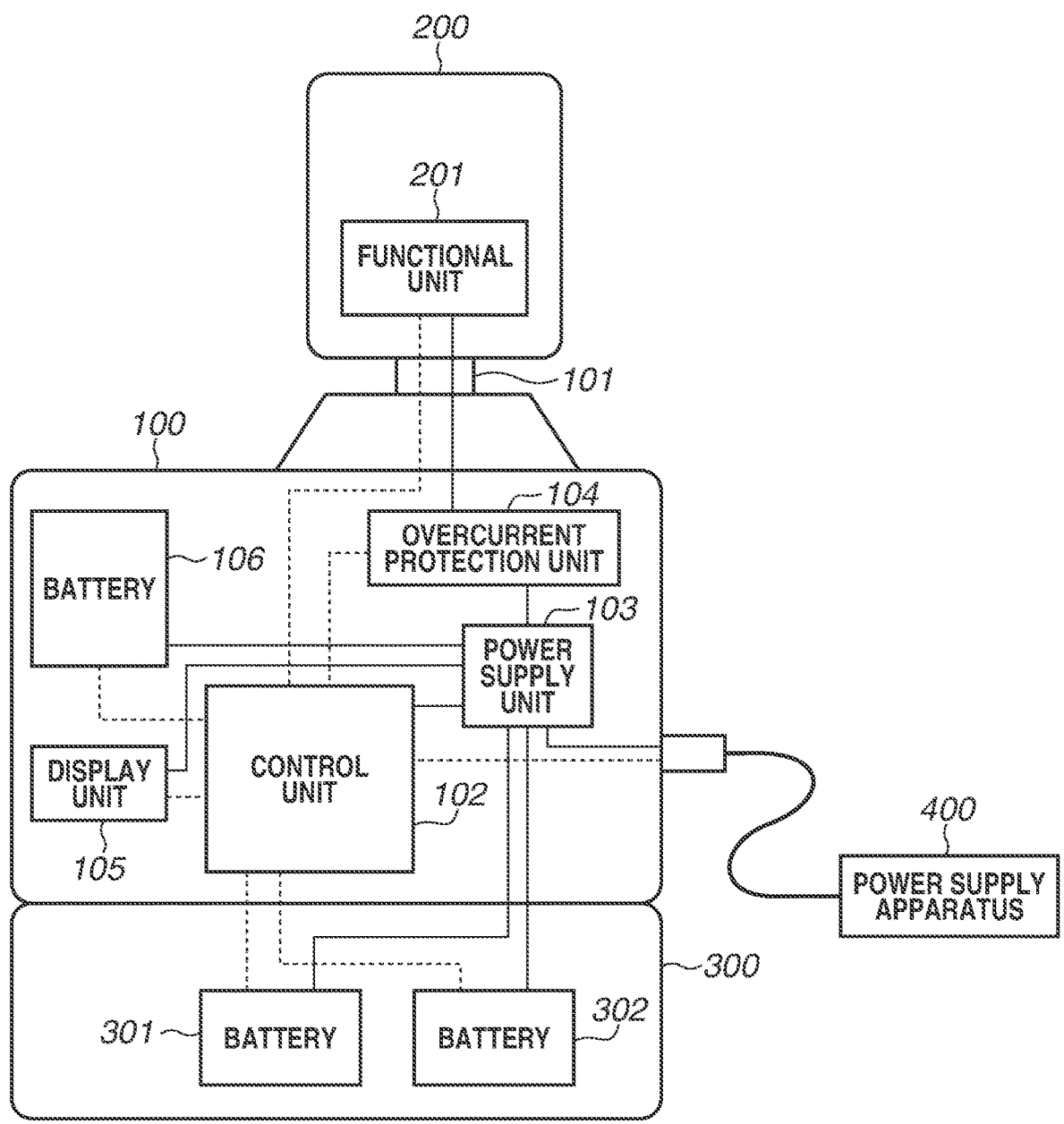
FIG. 1 is a block diagram illustrating components of an image capture apparatus according to a first exemplary embodiment.

[First Exemplary Embodiment] FIG. 1 is a block diagram illustrating components of an image capture apparatus 100 according to a first exemplary embodiment. At least one of an accessory apparatus 200, a battery grip 300, and a power supply apparatus 400 can be connected to the image capture apparatus 100. The image capture apparatus 100 can store a battery 106 therein, and the battery grip 300 can store batteries 301 and 302 therein. The battery 106 can be connected to the image capture apparatus 100. The batteries 301 and 302 can both be connected to the image capture apparatus 100 via the battery grip 300. The components of the image capture apparatus 100 can be operated using power supplied from the battery 106, 301, or 302 or the power supply apparatus 400. In FIG. 1, a solid line represents a power supply line, and a dotted line represents a communication line.

An accessory shoe 101 is a connection unit to which the accessory apparatus 200 is connected. A power supply unit 103 supplies power to the accessory apparatus 200 via the accessory shoe 101. A control unit 102 communicates with a functional unit 201 of the accessory apparatus 200 via the accessory shoe 101.

The control unit 102 operates as a hardware processor that controls the components of the image capture apparatus 100 by executing a program stored in a memory. The control unit 102 communicates with each of the accessory apparatus 200, the batteries 106, 301, and 302, the power supply apparatus 400, and the battery grip 300. The control unit 102 determines power suppliable from the power supply unit 103, power consumption of the image capture apparatus 100, and power suppliable to the accessory shoe 101.

The power supply unit 103 supplies power supplied from the power source (the batteries 106, 301, or 302 or the power supply apparatus 400) to each of the components of the image capture apparatus 100. In a case where the accessory apparatus 200 is connected to the accessory shoe 101, the power supply unit 103 supplies power supplied from the power source (the batteries 106, 301, or 302 or the power supply apparatus 400) to the accessory apparatus 200 via the accessory shoe 101. The power supply unit 103 generates a voltage to be supplied to each of the components of the image capture apparatus 100 using a voltage conversion circuit such as a direct current to direct current (DC-DC) converter. The batteries 106, 301, and 302 are each a rechargeable battery such as a lithium ion battery.

An overcurrent protection unit 104 monitors a current that flows from the power supply unit 103 to the accessory apparatus 200 via the accessory shoe 101. In a case where a current that is higher than or equal to a setting value of the overcurrent protection unit 104 flows from the power supply unit 103 to the accessory apparatus 200 via the accessory shoe 101, the overcurrent protection unit 104 blocks an electric current path from the power supply unit 103 to the accessory apparatus 200. This prevents a flow of overcurrent from the power supply unit 103 to the accessory apparatus 200 via the accessory shoe 101. The setting value for blocking the electric current path from the power supply unit 103 to the accessory apparatus 200 can be changed by the control unit 102. The current that flows from the power supply unit 103 to the accessory apparatus 200 via the accessory shoe 101 can be detected by the overcurrent protection unit 104 using a current detection circuit. The current that flows from the power supply unit 103 to the accessory apparatus 200 via the accessory shoe 101 can be calculated by the overcurrent protection unit 104 from the power suppliable from the power supply unit 103 and the power consumption of the image capture apparatus 100.

A display unit 105 includes a display device such as a liquid crystal display (LCD) and displays a message to a user.

The accessory apparatus 200 is an electronic device that is removable from the image capture apparatus 100. The accessory apparatus 200 is an electronic device that is operable as a flash unit, a video light, a wireless communication apparatus, a microphone, a viewfinder, or a monitor. The accessory apparatus 200 includes the functional unit 201 that provides a function as a flash unit, a video light, a wireless communication apparatus, a microphone, a viewfinder, or a monitor to a user. The functional unit 201 communicates with the control unit 102 of the image capture apparatus 100 and transmits power consumption information about the accessory apparatus 200 to the control unit 102.

The battery grip 300 is an electronic device that is removable from the image capture apparatus 100. At least one of the batteries 301 and 302 is connected to the battery grip 300. The battery grip 300 can supply power from the battery 301 or 302 to the image capture apparatus 100. While a configuration of the battery grip 300 in which the batteries 301 and 302 are connected is illustrated in FIG. 1, the configuration thereof is not limited thereto, and the number of batteries connected to the battery grip 300 can be one or can be three or more.

The power supply apparatus 400 is an electronic device that is removable from the image capture apparatus 100. The image capture apparatus 100 is connected to the power supply apparatus 400 via, for example, a universal serial bus (USB) interface that supports the USB Type-C and USB Power Delivery (PD) standards. The power supply apparatus 400 operates as an external power source that supplies power to the image capture apparatus 100. A control unit of the power supply apparatus 400 communicates with the control unit 102 of the image capture apparatus 100 and transmits power supply capacity information about the power supply apparatus 400 to the control unit 102.

Figure 2:
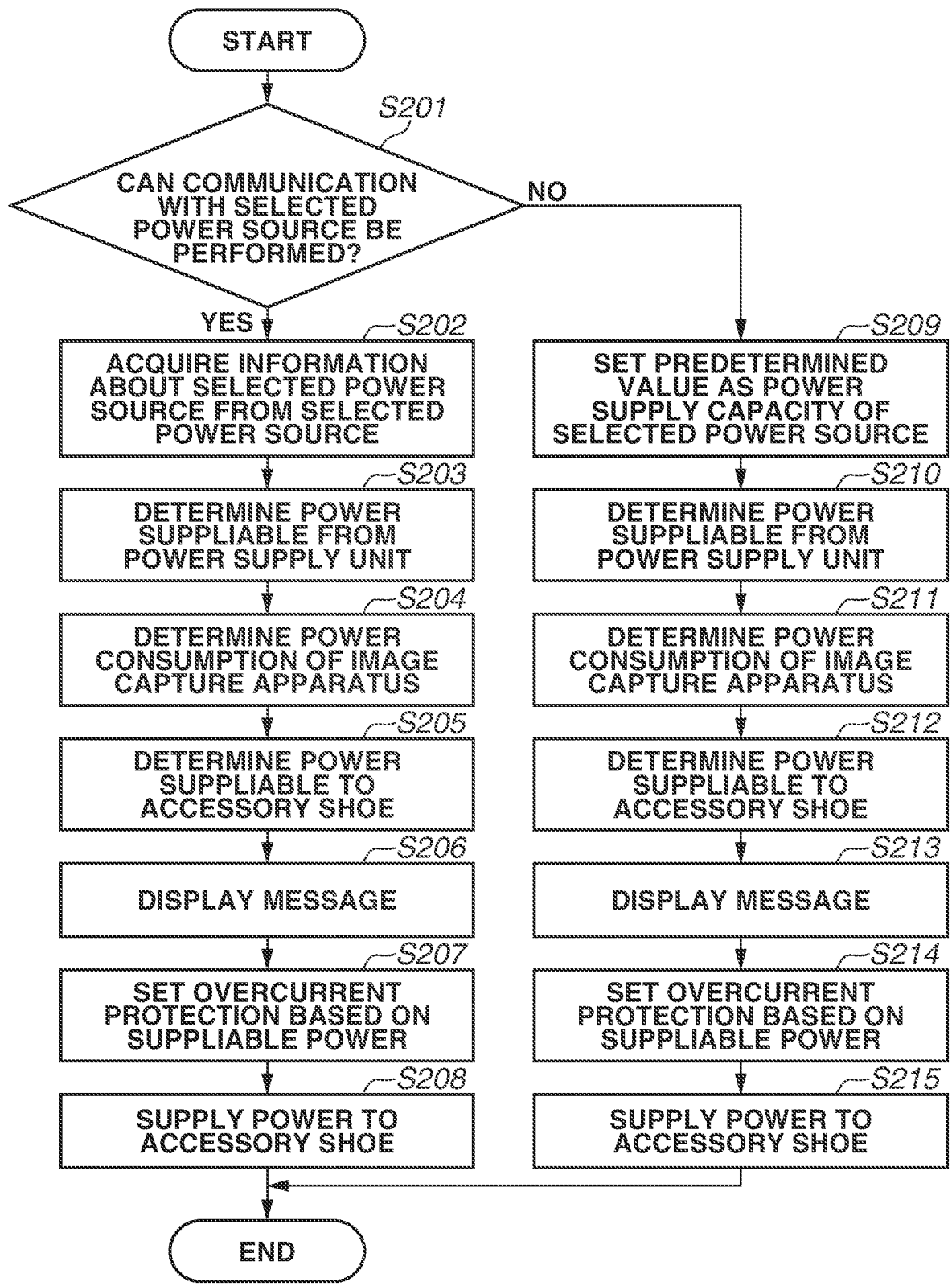
FIG. 2 is a flowchart illustrating a process of supplying power from a selected power source to an accessory apparatus according to one embodiment.

Next, a process of supplying power from a selected power source to the accessory apparatus 200 will be described below with reference to FIG. 2. The process is controlled by the control unit 102 executing a program stored in a memory.

In step S201, the control unit 102 determines whether predetermined communication with the selected power source can be performed. The selected power source is a power source that is selected from the batteries 106, 301, and 302 and the power supply apparatus 400 as a power source for the image capture apparatus 100. The predetermined communication can be communication for acquiring information about the type, state, remaining amount, power supply capacity, specification, or manufacturer of the selected power source or can be communication for identifying whether the selected power source is a predetermined battery or power supply apparatus. In a case where the control unit 102 determines that the predetermined communication with the selected power source can be performed (YES in step S201), the process proceeds to step S202. In a case where the control unit 102 determines that the predetermined communication with the selected power source cannot be performed (NO in step S201), the process proceeds to step S209.

In step S202, the control unit 102 communicates with the selected power source and acquires information (including power supply capacity information) about the selected power source from the selected power source. The power supply capacity information about the selected power source includes an electric current value (such as 1 A or 2 A) or a power value (such as 10 W) that the selected power source can supply. Furthermore, in step S202, the control unit 102 communicates with the power supply apparatus 400 and acquires information (including power supply capacity information) about the power supply apparatus 400 from the power supply apparatus 400. The power supply capacity information about the power supply apparatus 400 includes an electric current value (such as 1 A or 2 A) or a power value (such as 10 W) that the power supply apparatus 400 can supply.

In step S203, the control unit 102 determines power suppliable from the power supply unit 103 based on the power supply capacity information about the selected power source that is acquired in step S202.

In step S204, the control unit 102 determines power consumption of the image capture apparatus 100 based on an operation mode of the image capture apparatus 100.

In step S205, the control unit 102 determines power suppliable to the accessory shoe 101. For example, the control unit 102 determines the power suppliable to the accessory shoe 101 by subtracting the power consumption of the image capture apparatus 100 that is determined in step S204 from the power suppliable from the power supply unit 103 that is determined in step S203. For example, in a case where the power suppliable from the power supply unit 103 is 20 W and the power consumption of the image capture apparatus 100 is 15 W, the power suppliable to the accessory shoe 101 is 5 W (=20 W−15 W). Alternatively, the power suppliable from the power supply unit 103 that is determined in step S203 can be multiplied by a predetermined coefficient before the subtraction of the power consumption of the image capture apparatus 100 that is determined in step S204 from the power suppliable from the power supply unit 103 that is determined in step S203. In this way, a predetermined amount of margin can be added to the power suppliable to the accessory shoe 101.

In step S206, the control unit 102 determines whether the power suppliable to the accessory shoe 101 that is determined in step S205 is less than predetermined power. In a case where the power suppliable to the accessory shoe 101 that is determined in step S205 is not less than the predetermined power, the control unit 102 does not display a predetermined message on the display unit 105, and the process proceeds to step S207. In a case where the power suppliable to the accessory shoe 101 that is determined in step S205 is less than the predetermined power, the control unit 102 displays the predetermined message on the display unit 105, and then the process proceeds to step S207. The predetermined power is, for example, the power that the accessory apparatus 200 connected to the accessory shoe 101 needs to operate in a predetermined operation mode (e.g., normal operation mode). The predetermined message is information for notifying the user that the accessory apparatus 200 will not operate, that the accessory apparatus 200 will not operate in the predetermined operation mode, or that functions of the accessory apparatus 200 will be limited entirely or partially. FIGS. 3A to 3C. The message illustrated in FIG. 3A is an example of information for notifying the user that with the selected power source, the accessory apparatus 200 connected to the accessory shoe 101 will not operate. The message illustrated in FIG. 3B is an example of information for notifying the user that with the selected power source, sufficient power will not be supplied to the accessory apparatus 200 connected to the accessory shoe 101. The message illustrated in FIG. 3C is an example of information for notifying the user that with the selected power source, the functions of the accessory apparatus 200 connected to the accessory shoe 101 will be limited entirely or partially.

In step S207, the control unit 102 determines an electric current value for overcurrent protection based on the power suppliable to the accessory shoe 101 that is determined in step S205, and changes the setting value of the overcurrent protection unit 104 based on the determined electric current value. For example, in a case where the power suppliable to the accessory shoe 101 that is determined in step S205 is 5 W and the suppliable voltage is 5 V, the suppliable electric current at the accessory shoe 101 is 1 A. In this case, the control unit 102 can set a setting value determined when the electric current value for overcurrent protection is 1 A to the overcurrent protection unit 104, or can set a setting value obtained by multiplying the suppliable electric current by a predetermined coefficient to the overcurrent protection unit 104.

In step S208, the control unit 102 controls the power supply unit 103 to supply power from the power supply unit 103 to the accessory shoe 101. Consequently, the selected power source supplies power to the accessory apparatus 200.

In step S209, since the control unit 102 cannot perform the predetermined communication with the selected power source, the control unit 102 sets a predetermined value as the power supply capacity of the selected power source. The predetermined value is, for example, the power supply capacity of the selected power source in a case where the selected power source is a general battery or a power supply apparatus. Furthermore, in step S209, the control unit 102 communicates with the power supply apparatus 400 and acquires information (including power supply capacity information) about the power supply apparatus 400 from the power supply apparatus 400. The power supply capacity information about the power supply apparatus 400 includes an electric current value (such as 1 A or 2 A) or a power value (such as 10 W) that the power supply apparatus 400 can supply.

In step S210, the control unit 102 determines power suppliable from the power supply unit 103 based on the predetermined value that is set as the power supply capacity of the selected power source.

In step S211, the control unit 102 determines power consumption of the image capture apparatus 100 based on the operation mode of the image capture apparatus 100.

In step S212, the control unit 102 determines power suppliable to the accessory shoe 101. For example, the control unit 102 determines the power suppliable to the accessory shoe 101 by subtracting the power consumption of the image capture apparatus 100 that is determined in step S211 from the power suppliable from the power supply unit 103 that is determined in step S210. For example, in a case where the power suppliable from the power supply unit 103 is 20 W and the power consumption of the image capture apparatus 100 is 15 W, the power suppliable to the accessory shoe 101 is 5 W (=20 W−15 W). Alternatively, the power suppliable from the power supply unit 103 that is determined in step S210 can be multiplied by a predetermined coefficient before the subtraction of the power consumption of the image capture apparatus 100 that is determined in step S211 from the power suppliable from the power supply unit 103 that is determined in step S210. In this way, a predetermined amount of margin can be added to the power suppliable to the accessory shoe 101.

In step S213, the control unit 102 determines whether the power suppliable to the accessory shoe 101 that is determined in step S212 is less than the predetermined power. In a case where the power suppliable to the accessory shoe 101 that is determined in step S212 is not less than the predetermined power, the control unit 102 does not display a predetermined message on the display unit 105, and the process proceeds to step S214. In a case where the power suppliable to the accessory shoe 101 that is determined in step S212 is less than the predetermined power, the control unit 102 displays the predetermined message on the display unit 105, and then the process proceeds to step S214. The predetermined power is, for example, the power that the accessory apparatus 200 connected to the accessory shoe 101 needs to operate in a predetermined operation mode (e.g., normal operation mode). The predetermined message is information for notifying the user that the accessory apparatus 200 will not operate, that the accessory apparatus 200 will not operate in the predetermined operation mode, or that functions of the accessory apparatus 200 will be limited entirely or partially. Examples of the predetermined message displayed on the display unit 105 are illustrated in FIGS. 3A to 3C. The messages illustrated in FIGS. 3A to 3C are as described above.

In step S214, the control unit 102 determines an electric current value for overcurrent protection based on the power suppliable to the accessory shoe 101 that is determined in step S212, and changes the setting value of the overcurrent protection unit 104 based on the determined electric current value. For example, in a case where the power suppliable to the accessory shoe 101 that is determined in step S212 is 5 W and the suppliable voltage is 5 V, the suppliable electric current at the accessory shoe 101 is 1 A. In this case, the control unit 102 can set a setting value determined when the electric current value for overcurrent protection is 1 A to the overcurrent protection unit 104, or can set a setting value obtained by multiplying the suppliable electric current by a predetermined coefficient to the overcurrent protection unit 104.

In step S215, the control unit 102 controls the power supply unit 103 to supply power from the power supply unit 103 to the accessory shoe 101. Consequently, the selected power source supplies power to the accessory apparatus 200.

As described above, in the first exemplary embodiment, in the case where the predetermined communication with the selected power source can be performed, the power suppliable from the power supply unit 103 is determined based on information about the selected power source that is acquired from the selected power source. In the case where the predetermined communication with the selected power source cannot be performed, the power suppliable from the power supply unit 103 is determined based on the predetermined value. Then, the power suppliable to the accessory shoe 101 is determined from the power suppliable from the power supply unit 103 and the power consumption of the image capture apparatus 100 that is determined based on the operation mode of the image capture apparatus 100, and the selected power source supplies power to the accessory shoe 101. Furthermore, in a case where the power suppliable to the accessory shoe 101 is less than the predetermined power, the predetermined warning message can be displayed on the display unit 105. As described above, the supply of power from the selected power source to the accessory apparatus 200 via the accessory shoe 101 is controlled as appropriate based on whether the predetermined communication with the selected power source can be performed.

[Second Exemplary Embodiment] The various functions, processes, or methods described in the first exemplary embodiment can also be implemented by a personal computer, a microcomputer, a central processing unit (CPU), or a microprocessor executing a program. In a second exemplary embodiment, the personal computer, the microcomputer, the CPU, or the microprocessor will be referred to as a computer X. In the second exemplary embodiment, a program for controlling the computer X and implementing the various functions, processes, or methods described in the first exemplary embodiment will be referred to as a program Y.

The various functions, processes, or methods described in the first exemplary embodiment are implemented by the computer X executing the program Y. In this case, the program Y is supplied to the computer X via a computer-readable storage medium. The computer-readable storage medium according to the second exemplary embodiment includes at least one of a hard disk apparatus, a magnetic storage apparatus, an optical storage apparatus, a magneto-optical storage apparatus, a memory card, a volatile memory, and a non-volatile memory. The computer-readable storage medium according to the second exemplary embodiment is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all such modifications and equivalent structures.

This application claims the benefit of Japanese Patent Application No. 2020-136937, filed Aug. 14, 2020, which is hereby incorporated by reference herein in its entirety.

What is claimed is:

1. An image capture apparatus comprising:
   a connection unit to which an accessory apparatus is connected;
   a communication unit that communicates with a power source that supplies power to the image capture apparatus; and
   a control unit that determines power suppliable to the connection unit based on a predetermined value in a case where a predetermined communication with the power source is not to be performed,
   wherein the connection unit is configured to supply power from the power source to the accessory apparatus.

2. The image capture apparatus according to claim 1, further comprising a protection unit that blocks an electric current path from the power source to the connection unit in a case where a current higher than or equal to a setting value flows in the electric current path,
   wherein the control unit changes the setting value based on the predetermined value in the case where the predetermined communication with the power source is not to be performed.

3. The image capture apparatus according to claim 1, wherein the control unit determines the power suppliable to the connection unit based on power supply capacity information about the power source in a case where the predetermined communication with the power source is to be performed.

4. The image capture apparatus according to claim 3, wherein the control unit changes a setting value based on the power supply capacity information about the power source in the case where the predetermined communication with the power source is to be performed.

5. The image capture apparatus according to claim 1, further comprising a display unit that displays information indicating that supply of power to the accessory apparatus is to be limited in the case where the predetermined communication with the power source is not to be performed.

6. The image capture apparatus according to claim 1, wherein the power source is any one of a battery connected to the image capture apparatus, a battery connected to the image capture apparatus via a battery grip, or a power supply apparatus connected to the image capture apparatus.

7. A method comprising:
   communicating with a power source that supplies power to an image capture apparatus; and
   determining power suppliable to a connection unit to which an accessory apparatus is connected based on a predetermined value in a case where a predetermined communication with the power source is not to be performed,
   wherein the connection unit is configured to supply power from the power source to the accessory apparatus.

8. A non-transitory storage medium that stores a program causing a computer to execute a method, the method comprising:
   communicating with a power source that supplies power to an image capture apparatus; and
   determining power suppliable to a connection unit to which an accessory apparatus is connected based on a predetermined value in a case where a predetermined communication with the power source is not to be performed,
   wherein the connection unit is configured to supply power from the power source to the accessory apparatus.

* * * * *